United States Patent
Haevaker et al.

(10) Patent No.: US 10,695,837 B2
(45) Date of Patent: Jun. 30, 2020

(54) TURBOMACHINE COMPONENT AND METHOD OF MANUFACTURING OF SUCH COMPONENT WITH AN INCORPORATED FLUID CHANNEL

(71) Applicant: Siemens Aktiengesellschaft, Munich (DE)

(72) Inventors: Anders Haevaker, Linkoping (SE); Olle Lindman, Finspang (SE)

(73) Assignee: Siemens Aktiengesellschaft, Munich (DE)

(*) Notice: Subject to any disclaimer, the term of this patent is extended or adjusted under 35 U.S.C. 154(b) by 211 days.

(21) Appl. No.: 15/747,505

(22) PCT Filed: Jul. 28, 2016

(86) PCT No.: PCT/EP2016/068051
§ 371 (c)(1),
(2) Date: Jan. 25, 2018

(87) PCT Pub. No.: WO2017/045820
PCT Pub. Date: Mar. 23, 2017

(65) Prior Publication Data
US 2018/0214954 A1    Aug. 2, 2018

(30) Foreign Application Priority Data
Sep. 14, 2015   (EP) .................................... 15185108

(51) Int. Cl.
*B22F 5/00* (2006.01)
*F23R 3/28* (2006.01)
(Continued)

(52) U.S. Cl.
CPC ............ *B22F 5/009* (2013.01); *B22F 3/1055* (2013.01); *B22F 5/10* (2013.01); *B33Y 10/00* (2014.12);
(Continued)

(58) Field of Classification Search
CPC .. B22F 5/009; B22F 5/04; B22F 5/106; F02C 7/222; F23D 11/38; F23D 14/22;
(Continued)

(56) References Cited

U.S. PATENT DOCUMENTS

| 8,479,520 | B2* | 7/2013 | Terada | .................... | F23D 14/78 60/742 |
| 2003/0182945 | A1* | 10/2003 | Runkle | .................... | F02C 7/224 60/776 |

(Continued)

FOREIGN PATENT DOCUMENTS

| CN | 101784841 A | 7/2010 |
| CN | 102257304 A | 11/2011 |

(Continued)

OTHER PUBLICATIONS

EP Search Report dated Mar. 30, 2016, for EP patent application No. 15185108.6.
(Continued)

*Primary Examiner* — Scott J Walthour
(74) *Attorney, Agent, or Firm* — Beusse Wolter Sanks & Maier

(57) ABSTRACT

A turbomachine component having a solid body with an elongated clearance, a channel located within the clearance of that body, where the channel is free of struts between the channel and a section of the body which is surrounding the channel to provide a continuous thermal insulation gap between the channel and the section of the body. The channel and the body are built in an additive manufacturing generation process synchronously layer by layer, from a metallic powder, wherein successive layers are selectively fused to build the body and the channel. The channel is arranged inside the body as a loose component, loose inside of the clearance and distant to the body. Spacer elements are provided, wherein each of the spacer elements is physically attached to only one of its ends either to the channel or to the body and put the channel in position and distant to the body.

16 Claims, 3 Drawing Sheets

(51) Int. Cl.
- *F23D 11/38* (2006.01)
- *F23D 14/22* (2006.01)
- *B22F 3/105* (2006.01)
- *B22F 5/10* (2006.01)
- *B33Y 80/00* (2015.01)
- *B33Y 10/00* (2015.01)
- *F23D 17/00* (2006.01)

(52) U.S. Cl.
CPC .............. *B33Y 80/00* (2014.12); *F23D 11/38* (2013.01); *F23D 14/22* (2013.01); *F23D 17/002* (2013.01); *F23R 3/28* (2013.01); *F23R 3/283* (2013.01); *F23R 2900/00004* (2013.01); *Y02P 10/295* (2015.11)

(58) Field of Classification Search
CPC .............. F23D 17/002; F23D 2206/10; F23D 2900/00014; F23D 2900/00016; F23R 3/28; F23R 3/283; F23R 2900/00004
See application file for complete search history.

(56) References Cited

U.S. PATENT DOCUMENTS

| | | |
|---|---|---|
| 2010/0096037 A1 | 4/2010 | Lee et al. |
| 2010/0192586 A1 | 8/2010 | Terada et al. |

FOREIGN PATENT DOCUMENTS

| | | |
|---|---|---|
| DE | 19622249 A1 | 12/1996 |
| EP | 2837445 A1 | 2/2015 |
| EP | 2962790 A1 | 1/2016 |
| EP | 2963347 A1 | 1/2016 |
| GB | 1000809 A | 8/1965 |
| GB | 2440546 A | 2/2008 |
| GB | 2440547 A | 2/2008 |

OTHER PUBLICATIONS

International Search Report dated Nov. 10, 2016, for PCT/EP2016/068051.

* cited by examiner

TURBOMACHINE COMPONENT AND METHOD OF MANUFACTURING OF SUCH COMPONENT WITH AN INCORPORATED FLUID CHANNEL

CROSS REFERENCE TO RELATED APPLICATIONS

This application is the US National Stage of International Application No. PCT/EP2016/068051 filed Jul. 28, 2016, and claims the benefit thereof. The International Application claims the benefit of European Application No. EP15185108 filed Sep. 14, 2015. All of the applications are incorporated by reference herein in their entirety.

FIELD OF THE INVENTION

The invention relates to turbomachine component, particularly a gas turbine burner, and a method of manufacturing of such component with an incorporated fluid channel built in a common manufacturing process.

BACKGROUND OF THE INVENTION

Gas turbine engines—as one type of a turbomachine—comprise several hot components during operation. Particularly components of a gas turbine burner are subject to hot conditions. If liquid fuel or water is provided to nozzles in a burner, this liquid fuel or water may pass through metal parts with elevated temperature before entering the respective outlet nozzles.

If the liquid fuel is exposed to hot walls, the risk for coking is severe. Coked oil on fluid pipe walls may results in clogging of the pipes or the nozzle and thus result in malfunctioning of the burner and consequently of the gas turbine.

If water is exposed to hot walls, there is a risk for boiling which can result in steam generation thus instable behaviour of the nozzle resulting also in instable combustion.

Due to these problems it is one approach to use insulated liquid passages, e.g. formed by a "tube in a tube" concept, mainly by concentric pipes in two layers with metallic separators keeping the gap. This is a quite complicated manufacturing process involving brazing, bending and welding. Alternatively or additionally large sections of the liquid passages were kept at an exterior of the burner so that a heat transfer from the body to the passage is reduced. Nevertheless the manufacturing can be quite laborious, including possibly manual assembly steps.

Patent application GB 2440547 A shows a fluid carrying arrangement in which an inner layer for carrying fluid is surrounded by an insulating layer. The arrangement may be manufactured by a solid freedom fabrication process like selective laser or electron beam sintering or melting. Insulating material may be ceramic. The insulating layer may be porous.

SUMMARY OF THE INVENTION

The present invention seeks to mitigate the mentioned drawbacks.

This objective is achieved by the independent claims. The dependent claims describe advantageous developments and modifications of the invention.

The invention relates to a turbomachine component, particularly a gas turbine burner or another hot component of a gas turbine, comprising a solid body with an elongated clearance and a channel located within the clearance of that body, such that the channel is free of struts between the channel and the section of the body which is surrounding the channel to provide, by the elongated clearance, a continuous thermal insulation gap between the channel and the section of the body. The channel and the body are built in an additive manufacturing generation process synchronously layer by layer, particularly by selective laser sintering or selective laser melting, from a metallic powder, wherein successive layers are selectively fused to build a body and the channel. The channel is arranged inside the body as a loose component, loose inside of the clearance and distant to the body, and the turbomachine component further comprises spacer elements, wherein each of the spacer elements is physically attached to only one of its ends either to the channel or to the body and put the channel in position and distant to the body.

In other words, the component has no fixed struts between the channel and the surrounding body.

The elongated clearance may also be called a void, an opening, an annular space, or a tube. Struts in the sense of the invention are fixed connections between two surfaces. For example struts define a span that is solidly or fixedly connected at both ends of the strut to adjacent components. The channel according to the invention may alternatively also be called a tube or a passage, particularly a fluid or liquid passage.

The invention furthermore relates to a method of manufacturing such a turbomachine component comprising the following steps. First, to provide instructions to an additive manufacturing arrangement—i.e. a 3D printing arrangement by using additive manufacturing techniques—, the instructions defining the turbomachine component comprising the solid body with an elongated clearance and a channel located within the clearance of that body, such that the channel is free of struts between the channel and the section of the body which is surrounding the channel to provide, by the elongated clearance, a continuous thermal insulation gap between the channel and the section of the body. As a second step the method provides a step to generate—from the additive manufacturing arrangement—by additive manufacturing, particularly by selective laser sintering or selective laser melting, in response of the provided instructions, the channel and the body synchronously layer by layer from a metallic powder, wherein successive layers are selectively fused to build the body—the solid body—and the channel—i.e. the pipe-like structure of the channel. The instructions for generating—i.e. the instructions for generating the turbomachine component with its body and its channel—define the channel as a loose component, loose inside of the clearance and distant to the body. The instructions for generating further define spacer elements, each spacer element physically attached at only one of the channel and the solid body and put the channel in position and distant to the body.

Under "synchronously generating layer by layer" it is meant that the two mentioned components are built at the same time in the same production process. In other words the two components are simultaneously, or collectively, or concurrently generated.

The invention is particularly advantageous as two separate components are built in one common production process. Because up to now insulated liquid passages through a burner have been formed by a tube-in-tube concept, mainly by pipes in two layers with a metallic separator keeping a gap in-between. This is a quite complicated manufacturing process which typically involves several steps like brazing, bending and welding. The invention allows using only one manufacturing process that is used to generate both parts, i.e. additive manufacturing.

The invention is particularly advantageous for a hot component to which a liquid has to be transported. The liquid may be liquid fuel or water. If a liquid fuel is exposed to hot walls the risk for cooking is severe. Coked oil results in clogging of a nozzle, thus malfunction of the gas turbine. If on the other hand water as a liquid is exposed to a hot wall there is a risk for boiling of the water which can result in steam generation which then furthermore could result in instable behavior of the nozzle. The invention allows generating the channel and the surrounding body in one process step by providing also an insulation layer between the two parts so that the liquid which is transported through the channel is not affected by the heated surrounding body. The invention may also be advantageous for guiding gaseous media as the invention can guarantee a specific temperature of the gas because a heat transfer from the body into the transported gas is limited due to the insulation.

Due to the invention large portions or even the complete liquid burner of a gas turbine engine or similar parts of a similar turbomachine can be manufactured by an additive manufacturing process, the insulated liquid passages can be formed directly in the additive manufactured piece. The liquid passage provided by the channel can therefore be insulated by a substantially narrow air slot between the liquid passage or channel and the body of the burner. The small air slot corresponds to the previously mentioned continuous thermal insulation gap. The air slot can either be open or closed to the surrounding air. The air slots act like an insulation thus stopping the heat transfer from the body to the channel and therefore keeping the wall temperature of the liquid passage substantially low, compared to the temperature of the body.

The invention is also advantageous as previously possibly channels for liquids were not even incorporated into the hot body but were separated so that these liquids were guided separately in an external tube, external to the component. Now such a tube can be included directly into the hot component so that the channel is an inner part of the hot component and an inner part of the mentioned body. There is also a possibility for cost reduction because an insulation pipe can be incorporated directly inside the body of the component instead of being an extra detail outside of the body. The overall space consumption of the component can also be reduced.

In an embodiment the channel comprises an impermeable shell, the shell being impermeable for a fluid, particularly a liquid, and the channel is operable as a fluid duct particularly as a liquid duct. Therefore the channel is present to transport a fluid or a liquid without losing the content within the channel.

As previously defined, the channel is arranged inside the body as a loose component, loose inside of the clearance and distant to the body. The turbomachine component further comprises spacer elements, wherein each of the spacer elements is physically attached to only one of its ends either to the channel or to the body and put the channel in position and distant to the body. Even more advantageously all the mentioned components of channel, body and spacer elements may be 3D-printed by additive manufacturing at the same time layer by layer by the same manufacturing process. The spacer elements may be present to guarantee that the walls of the channel do not directly be in thermal contact with the body.

The spacer elements may also provide gaps at its non-attached ends for a loosely contact with an opposite surface. That means that if the spacer elements are directly attached to the channel then there is no fixed contact of the spacer elements with the inner surface of the clearance. Or the other way round if the spacer elements are fixedly connected to the inner surface of the clearance then the spacer elements may not be directly attached to an outer surface of the channel. This configuration allows slight adjustments in relative position of the channel in relation to the body. Furthermore the heat transfer from the body to the channel is kept minimal.

To provide such functionality the spacer elements may advantageously be formed as knobs or hemispheres. This allows displacement or adjustment of the wall in relation to the body. The knobs or the hemisphere may guarantee also only a very limited area of contact between the body and the channel so that a thermal transition of heat between the body and the channel is limited to a minimum.

The number of spacer elements advantageously shall be reduced to a minimum number. For example a distance between two adjacent spacer elements may be at least five times or ten times or twenty times or even larger than the diameter of the channel.

Besides the spacer elements which form only a loose contact there may be advantageously no fixed connections between the channel and the body along the full length of the channel. Even at axial ends of the channel there may no fixed connection between the channel and the body. So the channel and the body are completely disconnected over the full length of the channel, i.e. including its axial ends of inlet and outlet. This guarantees that no or only minimal heat transfer takes place between the body and the channel. Additionally the channel behaves mechanically as a pipe inserted into a solid body, allowing displacements or adjustments to another when the body increases in temperature and expands or due to vibrations of the body.

The channel may have a cross section which is in form of a circle. In other embodiments the cross section may also be an ellipse. Other cross sectional embodiments may also be possible like more complex shapes if this is advantageous for example due to limited space within the body. The clearance may advantageously have the exact same cross section as the channel but only with an additional distance. The distance between the outer surface of the channel and the inner surface of the clearance may at all positions be substantially the same. In other embodiments the distances between the opposite surfaces may differ along the circumference and along the length of the channel.

At one given axial position along the stretch of the channel only one spacer element may be present. Other spacer elements may occur at a different axial position. Two adjacent spacer elements may be positioned out of line and are rotated in their relative orientation within the clearance in respect of each other. This allows a good positioning of the channel within the clearance. The rotation between two adjacent elements may be advantageously 120 degrees between a first and a second spacer element in relation to an axis of the channel. The angle between two adjacent spacer elements may be also 90 degrees or other angles if advantageous for a specific body. In other words, the spacer elements are turned against each other and/or are twisted in respect of their position along the outer surface of the channel.

The turbomachine component may also comprise a nozzle for fluids, particularly liquids, the channel being connected to a supply cavity of the nozzle. Besides the channel may also end in the annular supply cavity connected to or being part of the nozzle so that all guided fluids or liquids will be distributed into the supply cavity so that it consecutively can be exhausted via the nozzle.

The nozzle according to the just indicated embodiment may be formed by an annular opening which is supplied by the channel and which may inject the liquid into a further fluid. The further fluid may be provided via a central opening of the nozzle which is surrounded by the annular opening for the liquid.

As already indicated before, the clearance, the body surrounding the clearance and the channel may be aligned equally spaced or aligned coaxially for the section of the body and its corresponding section of the channel. Therefore the formed gap between the clearance and the channel may be equidistant.

The invention is very flexible in respect of the form of the channel. The channel may follow a very complex path through the body. In other words the channel and the clearance may comprise the region of at least one change or a plurality of changes in direction and remain equally spaced or coaxially spaced throughout that region. So independently whether the channel has a bend or a turn the equidistance between the outer surface of the channel and the inner surface of the clearance remains. As a consequence very complex structures can be generated which cannot be produced by standard procedures. The invention allows highly sophisticated liquid channel geometries through a body which can otherwise not be produced.

It has to be noted that with the body a three-dimensional component is meant with a substantial thickness. A sheet metal is not been considered as a solid body according to the invention. Solid in this respect also means that there can be some hollow spaces in the body but particularly in the region of the channel a substantial amount of material is present which otherwise would result in a transfer of heat if the insulation gap would not be produced by the inventive concept. Nevertheless it could be possible that the solid body has numerous void areas to reduce the overall weight and possibly to allow further cooling effect. Solid in respect of the invention may also mean that the material is not flexible like a sheet metal.

According to the invention the same manufacturing process is used to generate at the same time the channel and the surrounding body. That means typically also both components are built from the same material.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

Furthermore examples have been and will be disclosed in the following sections by reference to gas turbine engines and its components. The invention is also applicable for any type of turbomachinery, e.g. compressors or steam turbines. Furthermore the general concept can be applied even more generally to any type of machine. It can be applied to rotating parts as well as stationary parts.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying drawings, of which.

The illustration in the drawing is schematic. It is noted that for similar or identical elements in different figures, the same reference signs will be used.

Some of the features and especially the advantages will be explained for an assembled gas turbine during operation, but obviously the features can be applied also to the single components of the gas turbine but may show the advantages only once assembled and during operation. But when explained by means of a gas turbine during operation none of the details should be limited to a gas turbine while in operation.

DETAILED DESCRIPTION OF THE INVENTION

Figure 1:
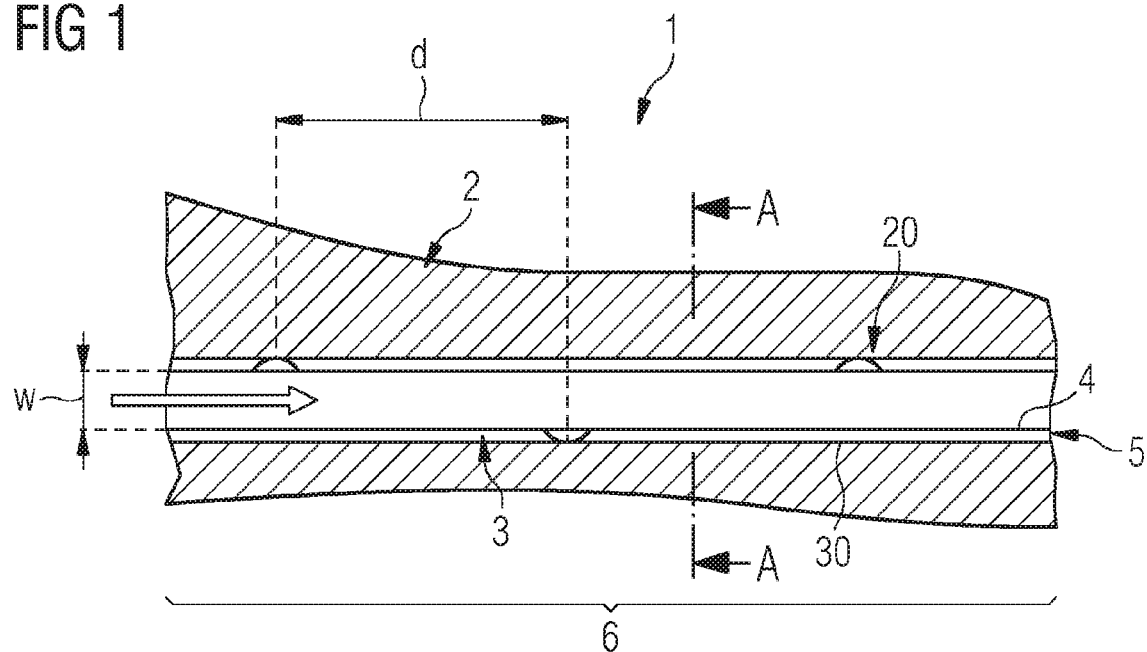
FIG. 1: shows schematically a sectional view of a burner body in which a channel is embodied according to the invention.

Referring now to FIG. 1, a part of a gas turbine burner is shown corresponding to a turbomachine component 1. A solid body 2 is pierced in a region of a section 6 of the body 2 by a channel 4. The channel 4 has a diameter w. The channel 4 is provided to guide liquids.

The channel 4 is surrounded by a gap 5 which occurs due to a clearance 3 of the body 2, the gap 5 providing a continuous thermal insulation for the channel 4. Thus, an outer surface of the channel 4 will be distant to an opposite surface 30, which is an inner surface of the clearance 3.

Figure 2:
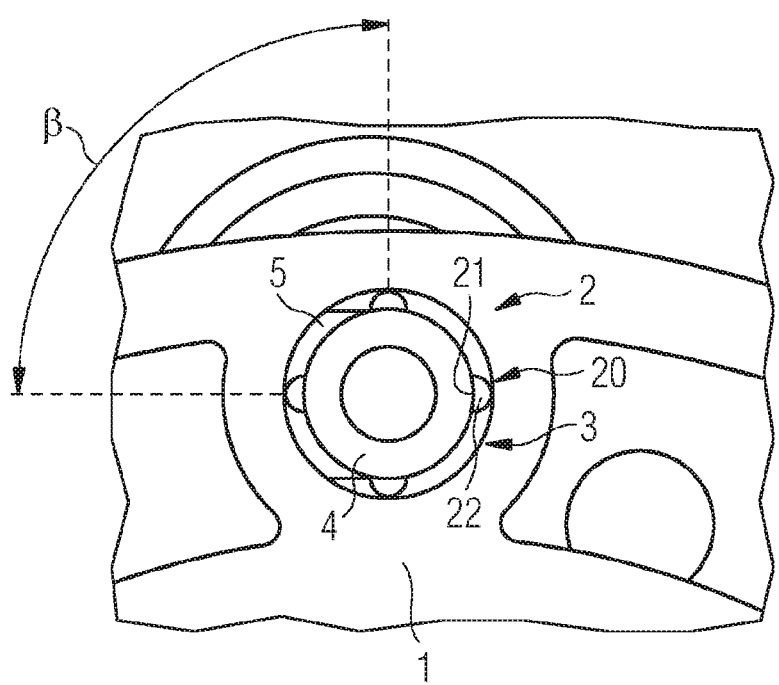
FIG. 2: shows schematically a sectional view of the burner body along the plane A-A of FIG. 1.

As shown in FIG. 1, the channel 4 and the clearance 3 have a longitudinal expanse in longitudinal direction of the channel 4 or the clearance 3. To keep the channel 4 in position, spacer elements 20 are present distributed along the length of the channel 4 and distributed around the circumference of the channel 4. According to FIG. 1 the position of the spacer elements 20 may just be at opposite position along the channel 4. But if seen together with FIG. 2, the spacer elements 20 could be in 90° angles to another around the circumference, meaning that in FIG. 1 only every second spacer element 20 is shown and the intermediate spacer element 20 (as indicated in FIG. 2) is not shown.

A distance between two adjacent spacer elements may be the distance d. Again, if FIG. 1 shows all existing spacer elements then the distance d is appropriately marked in FIG. 1. Assuming there are intermediate spacer elements not visible in the cut view of FIG. 1, as indicated in FIG. 2 by a 90° turn, then distance d would be incorrectly highlighted in FIG. 1.

The spacer elements 20 are indicated as hemispheres physically attached to the channel 4 but loosely in contact with the opposite surface 30.

What already can be seen from FIG. 1, that there is an embedded liquid passage surrounded by an insulation gap which allows transporting of liquids without major thermal effects by the surrounding hot body 2, which will be hot during operation.

FIG. 2 shows the component of FIG. 1 as seen from position A-A, as indicated in FIG. 1. Thus, FIG. 2 shows a fictitious cut through the component 1 in the region of section 6. Indicated is the channel 4 which is shown as a ring in this cross-sectional view. The component 1 in this figure even shows some hollow spaces, but the channel 4 is surrounded by further material of the body 2. In between the body 2 and the channel 4 there is the annular gap 5, in which 4 spacer elements 20 are indicated, each located around the circumference of the channel 4, where only a single spacer element 20 is present at a specific axial position of the channel 4 and the orientation of two consecutive spacer elements 20 are changed by an angle β of 90°. Different angles are possible, e.g. that each spacer element 20 is oriented around the circumference of the channel 4 with a rotation between 45° and 120°, particularly with a rotation of substantially 60°, 90°, or 120°.

In respect of advantageous geometries, the distance d between two spacer elements may be 3 to 25 times of the diameter w of the channel 4. Advantageously the range of the distance d is between 5 to 15 times of the diameter w.

The spacer elements 20 again are depicted as hemispheres. An end 21 of the spacer element 20 is physically connected to the channel 4. You could also say that the spacer element 20 is an intrinsic part of the channel 4. The opposite end of the hemisphere—a non-attached end 22—is facing the inner surface of the clearance 3 and may be in touching contact with that inner surface. But there will not be a solid connection with the inner surface.

Under consideration of FIGS. 1 and 2 it becomes obvious that a channel 4 can be produced that is placed in position of the clearance 3 through the body 2 via the spacer elements 20, but the channel 4 is not fixedly put in position but some relative movement would be allowed. The gap 5 allows to maintain a thermal insulation between the body 2 and the channel 4.

As shown in FIG. 2 the tube width of the channel 4 can be wider than the width of the gap 5. This may be advantageous as to avoid cracks in the channel 4 which could occur if the channel 4 would be implemented by a very thin wall structure.

Figure 3:
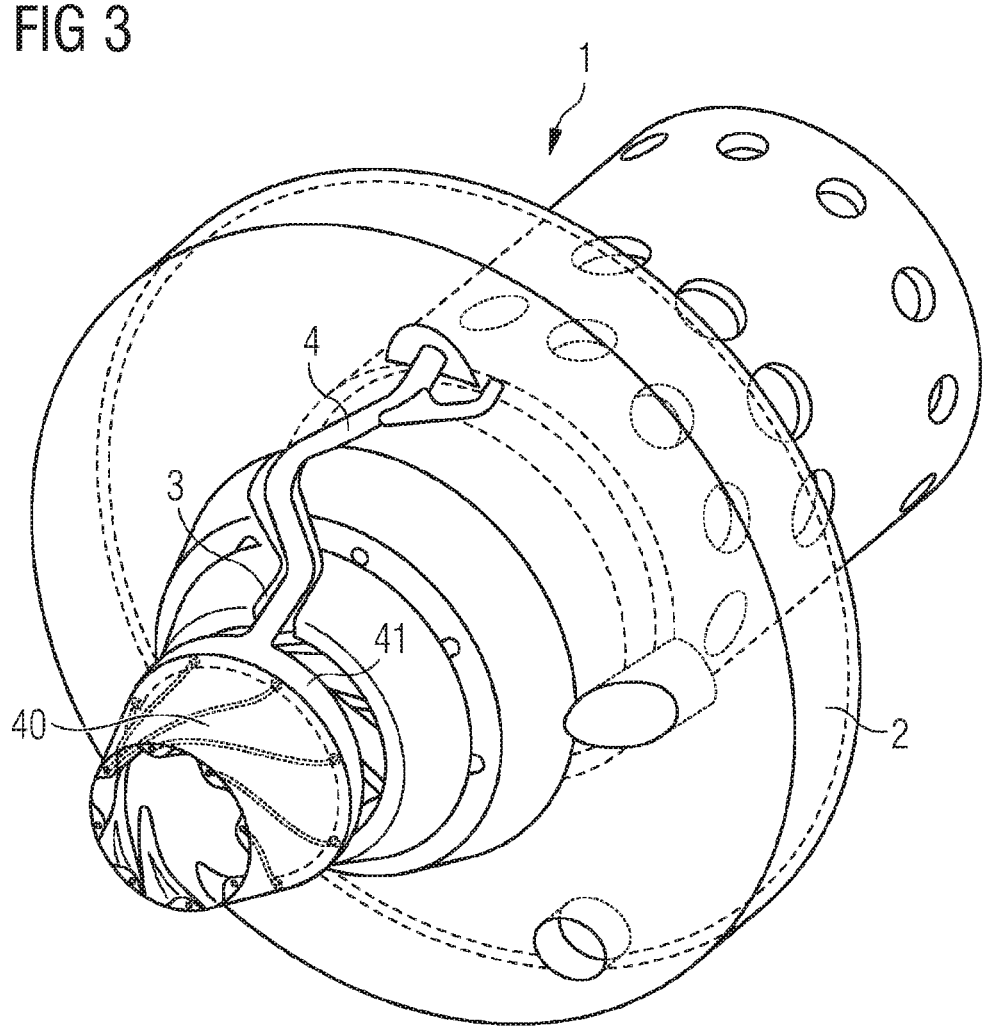
FIG. 3: shows a three dimensional view of a burner showing also internal structures in a see-through manner.

FIG. 3 now shows a complete nozzle 40 for liquids in a three dimensional see-through drawing. The channel 4 shows a more complex orientation with straight and curved sections along it longitudinal expanse. Nevertheless the component 1 is implemented at each possible longitudinal position of the channel 4 that the body 2 provides a clearance 3 to the channel 4, as indicated in FIG. 2.

According to FIG. 3 the channel 4 ends in an annular supply cavity 41 via which the liquid is distributed around the complete circumference of the supply cavity 41. The supply cavity 41 will provide the liquid to the nozzle 40. The nozzle 40 may be an annular liquid passage surrounding a substantially cylindrical passage for a further fluid, like air.

Alternatively the annular liquid passage will inject the liquid radially inwards into a hollow central opening of the nozzle 40.

Alternatively the annular supply cavity 41 may provide the liquid to a plurality of small passages that will guide the liquid to the tip of the nozzle.

Figure 4:
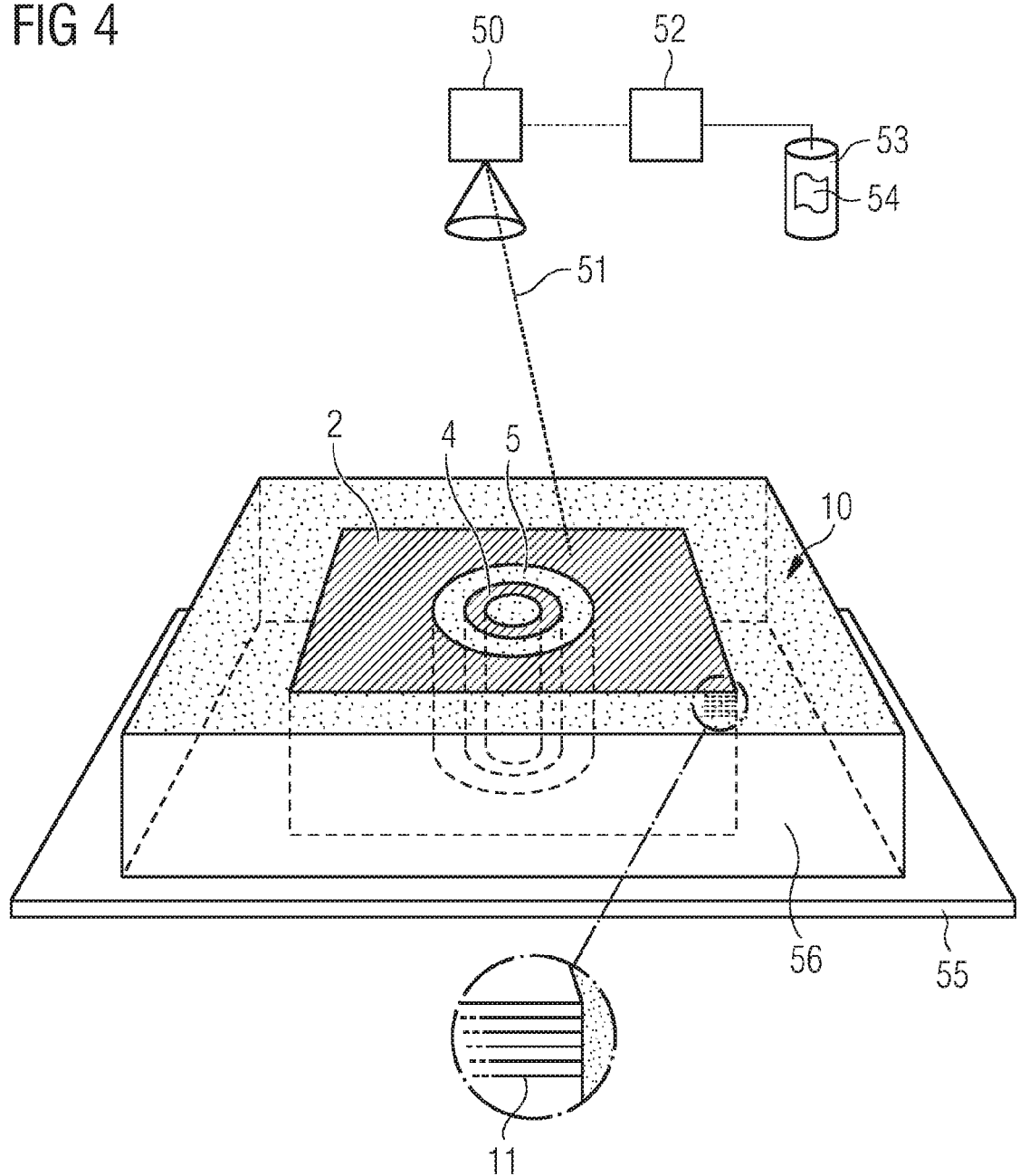
FIG. 4: illustrates a partly built burner during manufacturing via additive manufacturing in an additive manufacturing tool.

FIGS. 1 to 3 show the final component 1 as produced via an additive manufacturing process. The manufacturing process is explained in reference to FIG. 4. In there a 3D printing chamber for selective laser sintering or selective laser melting is indicated. In that chamber a substrate 55 is present onto which a metallic powder 10 is supplied layer by layer. After the supply of a layer 11 of the powder 10 a laser 50 is activated such that a laser beam 51 is directed to the locations at which the powder 10 is supposed to be solidified.

When layer by layer the powder 10 is distributed a powder bed 56 is created, in which also a solidified part is generated layer by layer. In the figure the body 2 is built layer by layer in direction of the longitudinal length of the channel 4. Thus the figure shows a solidified cylindrical element 4, a solidified surrounding body 2. In between loose powder 10 is shown in the gap 5 and also in the hollow region of the channel 4.

The laser 50 will be operated by a control unit 52, which executes instructions 54 as stored in a database 53. The instructions 54 define the shape of body 2 and the enclosed channel 4. According to the invention there will be instructions 54 that generate both the channel 4 and the body 2 at the same time. Also the spacer elements 20 are generated at the same additive manufacturing process. Thus, all components are built at the same time by the same production method. Therefore this is a very efficient way of producing such a turbomachine component.

Besides it allows to create such an embedded structure of a channel 4 embedded in a body 2 which otherwise could not be produced or at least would require a lot of extra assembly steps.

Advantageously the gap 5 is a perfect insulator, i.e. being a completely sealed cavity without in- or outlet. Alternatively a gas could be guided through the gap 5, e.g. in form of a cooling gas.

The invention claimed is:

1. A method of manufacturing a turbomachine component, comprising:

providing instructions to an additive manufacturing arrangement, the instructions defining the turbomachine component such that the turbomachine component comprises a solid body with an elongated clearance and a channel located within the elongated clearance of the solid body, such that the channel is free of struts between the channel and a section of the solid body which surrounds the channel to provide, by the elongated clearance, a continuous thermal insulation gap between the channel and the section of the solid body;

generating by additive manufacturing, in response to the provided instructions, the channel and the solid body synchronously layer by layer from a metallic powder, wherein successive layers are selectively fused to build the solid body and the channel, wherein the instructions define the channel as a loose component, loose inside of the elongated clearance and spaced from the solid body, and wherein the instructions further define spacer elements, each spacer element physically attached at only one of the channel or the solid body, the spacer elements spacing the channel from the solid body and providing respective narrow gaps at non-attached ends of the spacer elements for loose contact with an opposite surface.

2. The method of manufacturing according to claim 1, wherein the instructions define the channel with an impermeable shell, the shell being impermeable for a fluid and the channel being operable as a fluid duct.

3. The method of manufacturing according to claim 1, wherein the instructions further define the spacer elements being formed as knobs or hemi-spheres.

4. The method of manufacturing according to claim 1, wherein the instructions further define that, for the section the solid body, the elongated clearance, the solid body surrounding the elongated clearance, and the channel are aligned coaxially.

5. The method of manufacturing a according to claim 1, wherein the instructions additionally define a nozzle for a liquid, the channel being connected to a supply cavity of the nozzle.

6. A turbomachine component, comprising:
a solid body with an elongated clearance; and
a channel located within the elongated clearance of the solid body, such that the channel is free of struts between the channel and a section of the solid body which surrounds the channel to provide, by the elongated clearance, a continuous thermal insulation gap between the channel and the section of the solid body;
wherein the channel and the solid body are built in an additive manufacturing generation process synchronously layer by layer, from a metallic powder, wherein successive layers are selectively fused to build the solid body and the channel,
wherein the channel is arranged inside the solid body as a loose component, loose inside of the elongated clearance and spaced from the solid body,
and wherein the turbomachine component further comprises spacer elements, wherein each of the spacer elements is physically attached to only one of the channel or the solid body, the spacer elements spacing the channel from the solid body to provide gaps at respective non-attached ends of the spacer elements for providing loose contact with an opposite surface.

7. The turbomachine component according to claim 6, wherein the channel comprises an impermeable shell, the impermeable shell being impermeable for a fluid and the channel being operable as a fluid duct.

8. The turbomachine component according to claim 6, wherein the spacer elements are formed as knobs or hemispheres.

9. The turbomachine component according to claim 6, wherein a distance (d) between two adjacent spacer elements is at least five times, larger than a diameter (w) of the channel and/or
wherein two adjacent spacer elements are positioned out of line and are rotated in their relative orientation within the elongated clearance in respect to each other.

10. The turbomachine component according to claim 6, wherein the elongated clearance, the solid body surrounding the elongated clearance, and the channel are aligned equally spaced or are aligned coaxially over the section of the solid body and a corresponding section of the channel.

11. The turbomachine component according to claim 6, wherein the turbomachine component further comprises a nozzle for a fluid, the channel being connected to, and ending at, an annular supply cavity of the nozzle.

12. The turbomachine component according to claim 6, wherein the channel and the elongated clearance comprise a region of at least one change in direction and remain equally spaced or coaxially spaced throughout the region.

13. The method of manufacturing according to claim 1, wherein the turbomachine component is a gas turbine burner.

14. The turbomachine component according to claim 6, wherein the turbomachine component is a gas turbine burner.

15. The turbomachine component according to claim 9, wherein the distance (d) between two adjacent spacer elements is at least ten times larger than the diameter (w) of the channel.

16. The turbomachine component according to claim 9, wherein the distance (d) between two adjacent spacer elements is at least twenty times larger than the diameter (w) of the channel.

* * * * *